July 11, 1972 E. D. HALL ET AL Re. 27,425

WELL BORE CLEANER AND CEMENT DISPERSER

Original Filed April 25, 1966 2 Sheets-Sheet 1

Jesse E. Hall, Jr.
Elmer D. Hall
INVENTORS

BY Bertram H. Mann
ATTORNEY

WELL BORE CLEANER AND CEMENT DISPERSER

Original Filed April 25, 1966 2 Sheets-Sheet 2

Jesse E. Hall, Jr.
Elmer D. Hall
INVENTORS

BY Bertram D. Mann
ATTORNEY

United States Patent Office

Re. 27,425
Reissued July 11, 1972

27,425
WELL BORE CLEANER AND CEMENT DISPERSER

Elmer D. Hall, Weatherford, and Jesse E. Hall, Jr., Houston, Tex., assignors to Weatherford Oil Tool Company, Inc., Houston, Tex.

Original No. 3,380,534, dated Apr. 30, 1968, Ser. No. 544,914, Apr. 25, 1966. Application for reissue Apr. 20, 1970, Ser. No. 29,778
Int. Cl. E21b *37/02*
U.S. Cl. 166—173 6 Claims

Matter enclosed in heavy brackets [ ] appears in the original patent but forms no part of this reissue specification; matter printed in italics indicates the additions made by reissue.

ABSTRACT OF THE DISCLOSURE

A collar received about a well casing has radially or tangentially projecting ribs or spines with intervening flexible webbing which is inclined and cupped by the flowing fluid to form generally helical, flow-directing passages which cause swirling of the fluid and forceful impinging of the fluid against the well bore for cleaning of the same.

This invention relates to cement dispersers and bore wall and casing cleaners for use in cementing casing in wells.

Where casing is to be cemented in a well, it is advisable to first clean and bore wall to remove the filter cake and thereby insure a better bond between the bore wall and the cement. Various devices have been provided for this purpose—for instance, wipers as disclosed in Wright et al. Patent No. 2,826,253 and bristle-type scratchers as covered in Hall Patent No. 2,671,515 and others. However, some object to these on the grounds that they are either too harsh in their abrasive action against the bore wall or do not provide adequate cleaning action. Furthermore, such devices do not assist in dispersing the cement slurry evenly about the well annulus.

Accordingly, an object of the present invention is to provide a bore wall cleaner which will avoid the allegedly harsh action mentioned, yet which will provide adequate cleaning action.

Another object is to provide a bore wall cleaner which will divert and direct cement slurry itself into cleaning streams or jets of substantial velocity traveling along or about the bore wall.

Another object is to provide a bore wall cleaner which will respond to the force of cement slurry being pumped along the casing to form helical channels which will direct the slurry into bore wall cleaning contact.

Another object is to provide a bore wall cleaner embodying a webbing device which substantially traverses the annulus between the casing and bore wall, yet which can readily yield to permit running of the device into a well on the casing and also to permit the passage of cement slurry during the cementing operation.

Another object is to provide a hydraulic bore wall cleaner which can accommodate itself to substantial variations in hole cross-section.

Another object of the invention is to provide a cement disperser and/or bore wall cleaner device which is also designed to hydraulically clean the casing wall.

Still another object is to provide a bore wall cleaner and/or cement disperser which can function, also, as a cleavage barrier to reduce damage to the cement sheath resulting from perforation operations.

These objects and others hereafter appearing are attained substantially in the device herein illustrated which consists in general of a collar for encompassing a casing, preferably rotatably, resilient bracing elements projecting outwardly from the collar, and flexible webbing secured to the bracing elements. The webbing is designed to yield when subjected to the force of fluid passing the casing, to form axially-bowed, generally helical channels which divert and direct the cement slurry or other travelling well fluid in helical streams along the bore wall so as to hydraulically remove the filter cake therefrom. The collar itself is provided with recesses which admit a portion of the jetted well fluid into cleaning contact with the casing itself.

In the accompanying drawings which illustrate the invention,

Figure 1:
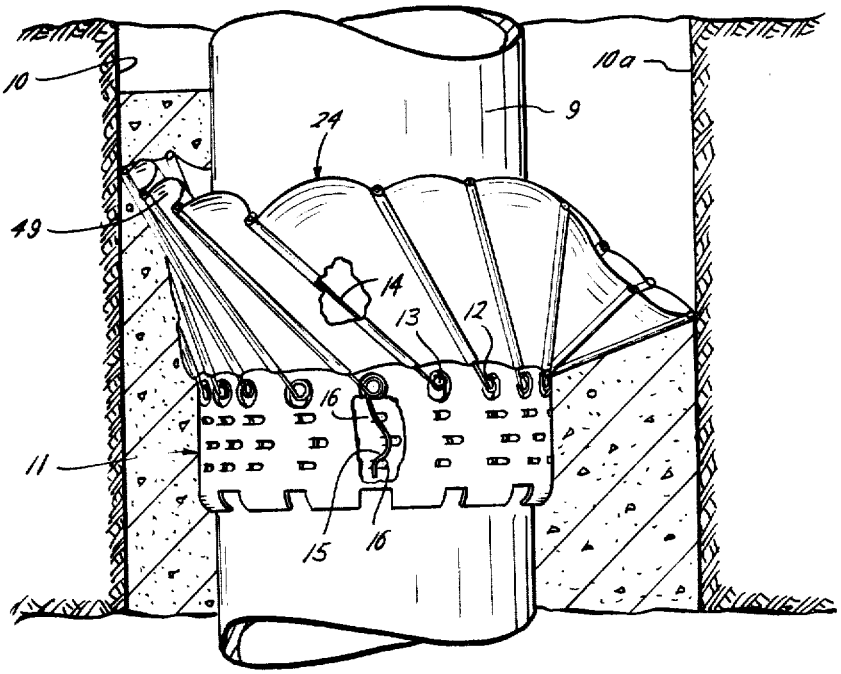
FIG. 1 is an elevation showing the novel bore wall cleaner and cement disperser device installed in a well.

FIG. 1 shows a section of casing 9 inserted in a well bore 10. Mounted on the casing, preferably rotatably, is a collar, generally designated 11, having an annular series of holes 12 in each of which is received the coiled intermediate portion 13 of a resilient wire 14. Suitable stop means (not shown) will be provided to limit movement of the collar along the casing. All of the wires 14, in their unstressed conditions, project generally outwardly and circumferentially of the collar, in the present instance, nearly tangentially. Preferably, the wires will be of sufficient length to permit their extension into a bore wall recess, as indicated by the key seat recess 10a in FIGS. 1 and 2. The inner end or tail of each wire is laid upon the inside of the collar, as at 15, and secured in position by bent tongues 16. If desired, inward bristles may be provided, as at 17 and 18 (FIG. 3), for scratch cleaning the casing surface. While the body of collar 11 is spaced somewhat from the casing to accommodate the wire end springs 13 and attaching means 15 and 16, the edges of the collar incline toward the casing, as at 19 and 20, and these edges are provided with equally-spaced or periodical slots 21. These slots admit the cement slurry or other fluid being pumped through the well annulus into hydraulic cleaning contact with the casing wall.

Figure 2:
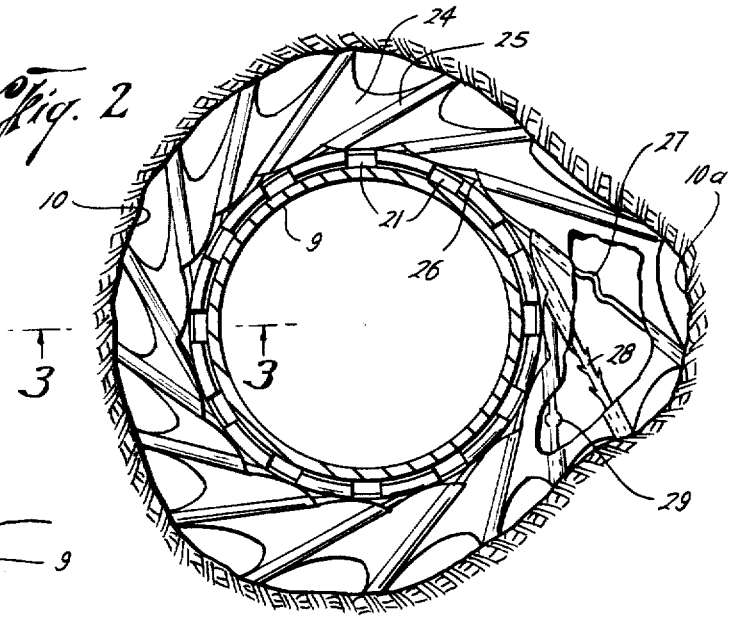
FIG. 2 is a top view of the device showing the casing in section.
Figure 3:
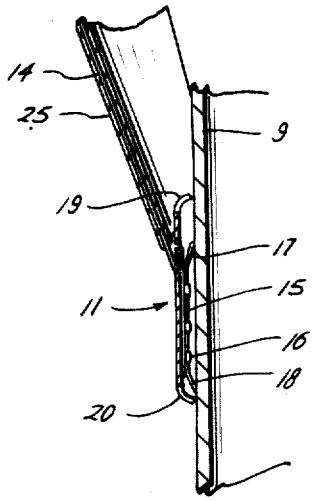
FIG. 3 is an enlarged detail section taken on line 3—3 of FIG. 2.

Secured to the resilient wires 14, in this instance by molding, is a flexible sheet or webbing, generally designated 24, conveniently made of rubber or other flexible material, either homogeneous or laminated. The webbing is thickened about the wires, as at 25, to adequately encompass and secure the same. FIG. 2 shows the inner edge of the webbing slightly spaced from the collar, as at 26, but this is not essential and if desired the webbing may closely embrace the outer surface of the collar. At 27, 28, and 29 are shown three different wire configurations for better securing the same to the webbing.

Figure 4:
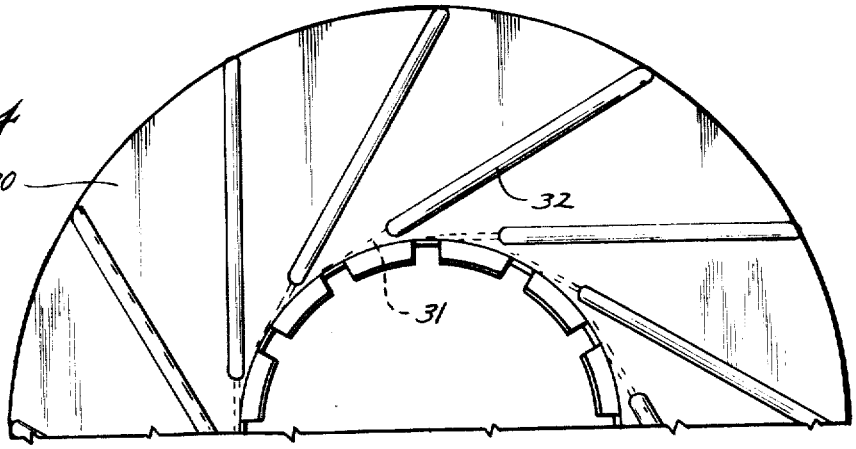
FIG. 4 is a top view of a modified form of bore wall cleaner device mounted on a casing shown in section.

In FIG. 4, a continuous hollow disk 30 of suitable flexible webbing, such as cloth, is shown secured to the generally tangential resilient wires 31 by means of separate strips of material 32 stitched or otherwise secured to the main body of the webbing.

Figure 5:
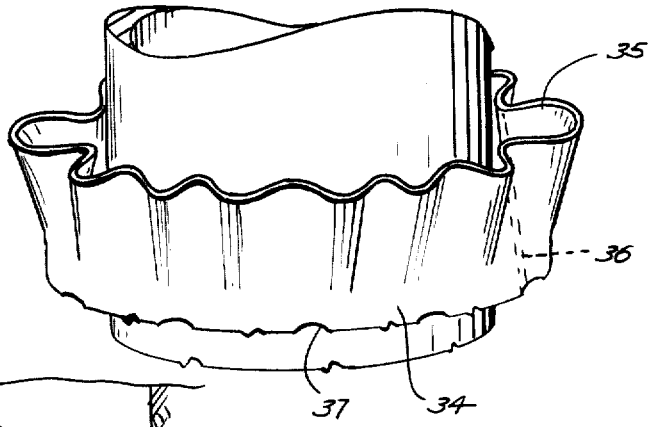
FIG. 5 is a perspective showing a portion of a further modified form of bore wall cleaner device.

In FIG. 5, the edge of the collar 34 is shown as scalloped, as at 35, to provide periodical entrances and exits for slurry or other well fluid to bring the same into cleaning contact with the casing wall. The main body of the collar is spaced outwardly from the casing, as indicated at 36, and is provided with holes 37 for the same purpose as holes 12 in FIG. 1.

Figure 6:
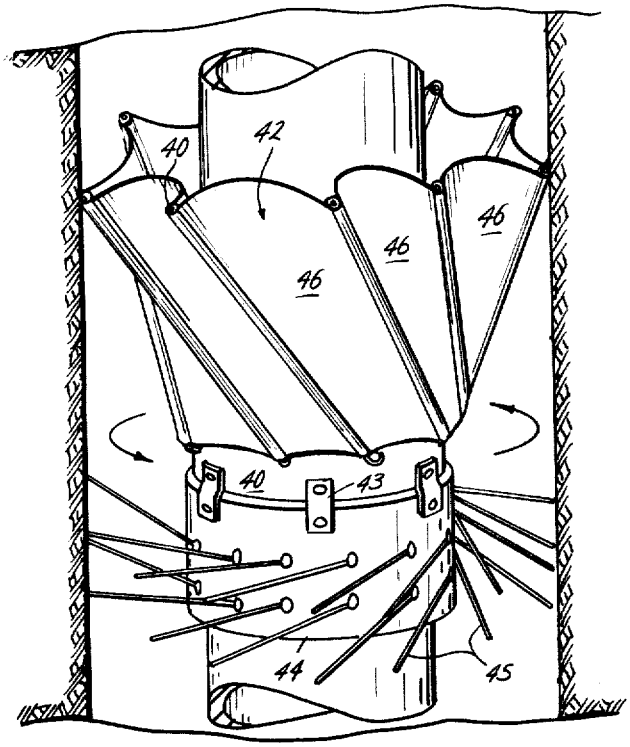
FIG. 6 shows a cleaner device as in FIG. 1 in combination with a mechanical bore wall cleaner of the scratcher type.

FIG. 6 shows a bore wall cleaner and cement disperser in general similar to that in FIG. 1 and including a collar 40 rotatable on the casing and with generally tangentially-projecting resilient wires 41 supporting webbing 42. Secured to this collar, as by means of clips 43, is a second collar 44 from which project generally tangential scratcher wires 45 of the type disclosed in the above-mentioned Hall Patent No. 2,671,515. During the cementing operation, the cement slurry diverted and directed through helical channels 46 will cause collars 40 and 44 to rotate, providing a mechanical scratching action against the bore wall at the same time as the helical streams of cement or well fluid hydraulically scour the bore wall and inward whiskers, as at 17 and 18 in FIG. 3, mechanically act upon the casing wall.

In operation, during running into the well, the resiliently-braced webbings 24, 30, and 42 of the various forms may yield upwardly, as indicated at the left side of FIG. 1 and in FIG. 6. When the casing reaches its position of setting, the cement slurry will be pumped in the usual manner downwardly through the casing, thence upwardly in the annulus between the casing and bore wall. As the slurry engages the webbing, it will be distorted upwardly by the force of the cement. The resultant pivoting or bending of the resilient wires 14 (FIG. 1) will reduce the circumferential distances between the wires providing a small amount of slack in the portions of the webbing traversing these spaces so as to form upwardly-bowed generally helical channels, as indicated at 49 in FIG. 1. These channels will divert and direct the cement slurry in helical streams or jets which will hydraulically scour the bore wall, thus removing the filter cake and/or other adherents without endangering the underlying formation structure.

Of course, the resilient wires 14 will yield in proportion to the force of the cement slurry so as to maintain substantially uniform hydraulic pressure against the bore wall and to accommodate varying rates of pumping. In case the cleaner device should be set abreast a recess, as at 10a in FIG. 1, the wires can accommodate themselves accordingly. With this arrangement, it is not necessary to reciprocate the casing, nor need the resilient wires 14 actually engage the casing wall, although they cannot damage the casing wall since it should not be necessary, as stated, to reciprocate the casing and wires in the manner of scratchers or abraders, as mentioned above. The use of the wall cleaner as a kind of motor to rotate a more conventional scratcher, as shown in FIG. 6, may have certain advantages.

Another advantage of the herein-disclosed type of bore wall cleaner and cement disperser is that, due to its substantial traverse of the annulus between the casing and bore wall after the cement has hardened, the device may serve as a cleavage barrier for use in the method of cementing and completing described in Patent No. 3,064,-731. Thus, the device may serve the multiple purposes of a cleaner for the bore wall and casing, a cement disperser, and a cleavage barrier.

Various details of the invention may be modified as will occur to those skilled in the art, and the exclusive use of all modifications as come within the scope of the appended claims is contemplated.

We claim:

1. A casing cementing tool comprising a collar for mounting about a casing, circumferentially-spaced bracing elements mounted on and projecting outwardly and circumferentially from said collar, and flexible webbing traversing the spaces between said elements, said webbing being yieldable under the influence of fluid moving along the casing to form generally spirally-disposed, fluid-directing channels for diverting fluid being forced along the casing spirally thereabout.

2. A cementing tool as described in claim 1 in which said bracing elements are laterally yieldable under the influence of fluid being forced along the casing to reduce the distances between said elements and thereby provide channel forming slack in said webbing.

3. A cementing tool as described in claim 1 in which said webbing is of sufficient radial width to at least approach the bore wall and thereby confine and direct streams of fluid being forced along the casing into cleaning contact with the bore wall.

4. A cementing tool as described in claim 1 further including channels at the inside of said collar for directing the fluid against the casing wall.

5. The combination with a well casing of a cement disperser and bore wall cleaner comprising a collar received about the casing, a plurality of resilient wires secured to and projecting outwardly and circumferentially from said collar; a flexible webbing secured to said wires for diverting and helically directing cement slurry being forced along the casing into cleaning engagement with the bore wall, said collar being rotatable on the casing under the influence of cement slurry being forced through the annulus between the casing and the bore wall, and a mechanical cleaning device secured to said collar and rotatable therewith.

*6. A cement dispersing and bore wall cleaning tool for use in cementing casing comprising a collar for mounting about a casing flexible webbing mounted on and projecting outwardly from said collar, and circumferentially spaced bracing elements extending outwardly and circumferentially from said collar along said webbing, said webbing between said elements being yieldable under the influence of fluid moving along the casing to form generally spirally disposed, fluid directing channels for diverting said fluid spirally about the casing.*

References Cited

The following references, cited by the Examiner, are of record in the patented file of this patent or the original patent.

UNITED STATES PATENTS

| | | | |
|---|---|---|---|
| 1,767,198 | 6/1930 | Baker | 166—241 |
| 2,672,200 | 3/1954 | Paterson | 166—202 |
| 2,929,455 | 3/1960 | Godbey | 166—202 |
| 2,935,132 | 4/1960 | Arterbury et al. | 166—177 |
| 3,114,422 | 12/1963 | Solum et al. | 166—241 |
| 3,119,451 | 1/1964 | Hall | 166—241 |
| 3,196,952 | 7/1965 | Solum | 166—241 |

JAMES A. LEPPINK, Primary Examiner

UNITED STATES PATENT OFFICE
CERTIFICATE OF CORRECTION

Patent No. Re. 27,425 Dated July 11, 1972

Inventor(s) Elmer D. Hall and Jesse E. Hall, Jr.

It is certified that error appears in the above-identified patent and that said Letters Patent are hereby corrected as shown below:

In column 4, line 40 (third line of claim 6), a comma should appear after the word "casing".

Signed and sealed this 9th day of January 1973.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334